United States Patent
Xu et al.

(10) Patent No.: US 12,554,251 B2
(45) Date of Patent: Feb. 17, 2026

(54) CONTROL METHOD, AND CONTROL DEVICE FOR AUXILIARY PIPELINE OF EXCAVATOR, WORKING MACHINE AND ELECTRONIC APPARATUS

(71) Applicant: SHANGHAI SANY HEAVY MACHINERY CO., LTD, Shanghai (CN)

(72) Inventors: Hao Xu, Shanghai (CN); Zehan Dai, Shanghai (CN)

(73) Assignee: SHANGHAI SANY HEAVY MACHINERY CO., LTD, Shanghai (CN)

( * ) Notice: Subject to any disclaimer, the term of this patent is extended or adjusted under 35 U.S.C. 154(b) by 35 days.

(21) Appl. No.: 18/449,889

(22) Filed: Aug. 15, 2023

(65) Prior Publication Data

US 2023/0384768 A1 Nov. 30, 2023

Related U.S. Application Data

(63) Continuation of application No. PCT/CN2021/123253, filed on Oct. 12, 2021.

(30) Foreign Application Priority Data

Apr. 22, 2021 (CN) .......................... 202110437588.7

(51) Int. Cl.
G05B 19/416 (2006.01)
(52) U.S. Cl.
CPC .. *G05B 19/416* (2013.01); *G05B 2219/37371* (2013.01)
(58) Field of Classification Search
CPC ......... G05B 19/416; G05B 2219/37371; E02F 3/3654; E02F 3/966; E02F 9/2275;
(Continued)

(56) References Cited

U.S. PATENT DOCUMENTS

2012/0095733 A1* 4/2012 Rossi ...................... E21B 43/00
703/2
2014/0046552 A1 2/2014 Tsuruga et al.
(Continued)

FOREIGN PATENT DOCUMENTS

CN 1035868 A 9/1989
CN 102296665 A * 12/2011 ............ E02F 9/2232
(Continued)

OTHER PUBLICATIONS

First Office Action issued in counterpart Chinese Patent Application No. 202110437588.7, dated Jul. 29, 2023.
(Continued)

*Primary Examiner* — Thomas C Lee
*Assistant Examiner* — Michael Tang
(74) *Attorney, Agent, or Firm* — Westbridge IP LLC (57) ABSTRACT

Disclosed are a control method and a control device for an auxiliary pipeline of an excavator, a working machine and an electronic apparatus. The control method for the auxiliary pipeline of the excavator includes: acquiring a pressure difference between an input end and an output end of the auxiliary pipeline of the excavator; obtaining an output flow of the auxiliary pipeline based on the pressure difference; and controlling the output flow of the auxiliary pipeline to adjust to be within a target flow range when the output flow of the auxiliary pipeline is beyond the target flow range. The control method for the auxiliary pipeline of the excavator according to the present application can solve the defect of relatively large pressure and flow distortion of the auxiliary pipeline in the related art, and realize an accurate control to the input and output of the flow of the auxiliary pipeline.

6 Claims, 3 Drawing Sheets

(58) Field of Classification Search
CPC .. E02F 9/267; E02F 9/226; E02F 9/22; G06F 30/15; G06F 2119/14
USPC .......................................................... 700/282
See application file for complete search history.

(56) References Cited

U.S. PATENT DOCUMENTS

2016/0312728 A1* 10/2016 Ge ....................... F02D 41/0007
2017/0003150 A1*  1/2017 Noboa .................... G01F 1/363
2022/0405449 A1* 12/2022 Sun ......................... G06F 30/18

FOREIGN PATENT DOCUMENTS

| | | | |
|---|---|---|---|
| CN | 105026773 A | | 11/2015 |
| CN | 109778937 A | | 5/2019 |
| CN | 110409544 A | | 11/2019 |
| CN | 113158344 A | | 7/2021 |
| JP | 2018159210 A | * | 10/2018 |
| JP | 2020160693 A | * | 10/2020 |
| WO | WO-2010034889 A1 | * | 4/2010 ................ E21F 5/04 |

OTHER PUBLICATIONS

International Search Report and Written Opinion issued in corresponding PCT Application No. PCT/CN2021/123253, dated Jan. 20, 2022.

* cited by examiner

CONTROL METHOD, AND CONTROL DEVICE FOR AUXILIARY PIPELINE OF EXCAVATOR, WORKING MACHINE AND ELECTRONIC APPARATUS

CROSS-REFERENCE TO RELATED APPLICATIONS

This application is a continuation application of International Application No. PCT/CN2021/123253, filed on Oct. 12, 2021, which claims priority to Chinese Patent Application No. 202110437588.7, filed on Apr. 22, 2021. The disclosures of the above-mentioned applications are incorporated herein by reference in their entireties.

TECHNICAL FIELD

The present application relates to the technical field of an excavator, and in particular, to a control method and a control device for an auxiliary pipeline of an excavator, a working machine and an electronic apparatus.

BACKGROUND

An excavator needs to be equipped with an auxiliary pipeline to use an auxiliary device such as a breaker hammer and a hydraulic shear. There are various types of auxiliary devices and power requirements, so pressure/flow required are also different. At present, the excavator does not detect the actual flow of the auxiliary pipeline. Although the positive flow control system of some excavators can estimate the flow of the auxiliary pipeline through a current of a proportional valve of a main pump, due to factors such as an overflow valve of the auxiliary pipeline, the estimated flow of the auxiliary pipeline is also extremely inaccurate. Since a pressure sensor is far away from an actuator for an auxiliary device, the pressure and the flow of the auxiliary pipeline are greatly distorted. This makes the excavator fail to output the specified pressure and flow as required, and even damages the main pump or other hydraulic components of the excavator. Therefore, we need a device to accurately control the input and output of the flow of the auxiliary pipeline, thereby reducing the risk of the above situation.

SUMMARY

The present application provides a control method and a control device for an auxiliary pipeline of an excavator, a working machine and an electronic apparatus to solve the defect of large pressure and flow distortion of the auxiliary pipeline in the related art, and to realize accurate control of the input and output of the flow of the auxiliary pipeline.

The present application provides the control method for the auxiliary pipeline of the excavator, including:
  acquiring a pressure difference between an input end and an output end of the auxiliary pipeline of the excavator;
  obtaining an output flow of the auxiliary pipeline based on the pressure difference; and
  controlling the output flow of the auxiliary pipeline to adjust to be within a target flow range in response to that the output flow of the auxiliary pipeline is beyond the target flow range.

According to the control method for the auxiliary pipeline of the excavator of the present application, obtaining the output flow of the auxiliary pipeline based on the pressure difference includes:
  inputting the pressure difference to a relationship model between the pressure difference and the output flow of the auxiliary pipeline to obtain the output flow of the auxiliary pipeline.

The relationship model between the pressure difference and the output flow is obtained by the following method:
  acquiring multiple sets of experimental data of the pressure difference and multiple sets of experimental data of the output flow of the auxiliary pipeline; and
  fitting the multiple sets of experimental data of the pressure difference and the multiple sets of experimental data of the output flow based on an interpolation method to obtain the relationship model between the pressure difference and the output flow.

According to the control method for the auxiliary pipeline of the excavator of the present application, the relationship model between the pressure difference and the output flow satisfies:
  $Q_o = K\sqrt{\Delta P}$, $Q_o$ is the output flow of the auxiliary pipeline, $\Delta P$ is the pressure difference of the auxiliary pipeline, and K is a correlation coefficient between the pressure difference and the output flow.

According to the control method for the auxiliary pipeline of the excavator of the present application, controlling the output flow of the auxiliary pipeline to adjust to be within a target flow range in response to that the output flow of the auxiliary pipeline is beyond the target flow range includes:
  decreasing or increasing the output flow of a main pump to control the output flow of the auxiliary pipeline to adjust to be within the target flow range in response to that the output flow of the auxiliary pipeline is beyond the target flow range; wherein an input end of the auxiliary pipeline is connected to an output end of the main pump.

According to the control method for the auxiliary pipeline of the excavator of the present application, decreasing or increasing the output flow of a main pump in response to that the output flow of the auxiliary pipeline is beyond the target flow range includes:
  obtaining an output flow value of the main pump based on a difference between the output flow of the auxiliary pipeline and the target flow range, in response to that the output flow of the auxiliary pipeline is beyond the target flow range;
  inputting the output flow value of the main pump to the relationship model between a current value of a proportional valve of the main pump and the output flow of the main pump to obtain the current value of the proportional valve of the main pump; and
  controlling an opening of the proportional valve of the main pump based on the current value of the proportional valve of the main pump, to decrease or increase the output flow of the main pump.

The present application further provides the control device for the auxiliary pipeline of the excavator, including:
  a pressure difference acquiring module configured to acquire a pressure difference between an input end and an output end of the auxiliary pipeline of the excavator;
  an output flow calculation module configured to obtain an output flow of the auxiliary pipeline based on the pressure difference; and
  an output flow control module configured to control the output flow of the auxiliary pipeline to adjust to be within a target flow range in response to that the output flow of the auxiliary pipeline is beyond the target flow range.

According to the control device for the auxiliary pipeline of the excavator of the present application, the output flow calculation module is configured to input the pressure difference to the relationship model between the pressure difference and the output flow of the auxiliary pipeline to obtain the output flow of the auxiliary pipeline.

The control device for the auxiliary pipeline of the excavator further includes:
- a pressure difference and flow data acquisition module configured to acquire multiple sets of experimental data of the pressure difference and multiple sets of experimental data of the output flow of the auxiliary pipeline; and
- a pressure difference and flow relationship model acquisition module configured to fit the multiple sets of experimental data of the pressure difference and the multiple sets of experimental data of the output flow based on an interpolation method to obtain a relationship model between the pressure difference and the output flow.

The present application further provides the working machine, including the control device for an auxiliary pipeline of an excavator described above.

The present application further provides the electronic apparatus, including a memory, a processor, and a computer program stored on the memory and operable on the processor, wherein steps of the control method for an auxiliary pipeline of an excavator as described in any of the above is implemented when the processor executes the program.

The present application further provides a non-transitory computer-readable storage medium, on which a computer program is stored, wherein steps of the control method for an auxiliary pipeline of an excavator as described in any of the above is implemented when the computer program is executed by a processor.

The present application provides a control method and a control device for an auxiliary pipeline of an excavator, a working machine and an electronic apparatus. The output flow of the auxiliary pipeline is obtained by inputting the pressure difference of the auxiliary pipeline to the relationship model between the pressure difference and the output flow of the auxiliary pipeline. Compared with the related art in which the flow of the auxiliary pipeline is estimated by the current value of the proportional valve of the main pump, the output flow of the auxiliary pipeline obtained in the technical solution of the present application is more in line with the actual situation. Then adjustment is made directly based on the relationship between the output flow and the target flow range of the auxiliary pipeline, which can avoid the distortion of the pressure and the flow in the auxiliary pipeline, and can also ensure that the output flow of the auxiliary pipeline is stable within the target flow range. Therefore, it is possible to accurately control the input and the output of the auxiliary pipeline, and reduce the damage to the main pump or other hydraulic components of the excavator caused by the distortion of the pressure and the flow of the auxiliary pipeline.

BRIEF DESCRIPTION OF THE DRAWINGS

In order to more clearly illustrate the technical solutions in the present application or related technologies, the following will briefly introduce the accompanying drawings that need to be used in the description of the embodiments or related technologies. Obviously, the accompanying drawings in the following description are some embodiments of the present application. For those skilled in the art, other drawings can also be obtained based on these drawings without any creative effort.

DETAILED DESCRIPTION OF THE EMBODIMENTS

In order to make the purpose, technical solutions and advantages of the present application clearer, the technical solutions in the present application will be clearly and completely described below in conjunction with the accompanying drawings in the present application. Obviously, the described embodiments are part of the embodiments of the present application, not all of them. Based on the embodiments in the present application, all other embodiments obtained by those skilled in the art without creative efforts fall within the protection scope of the present application.

Figure 1:
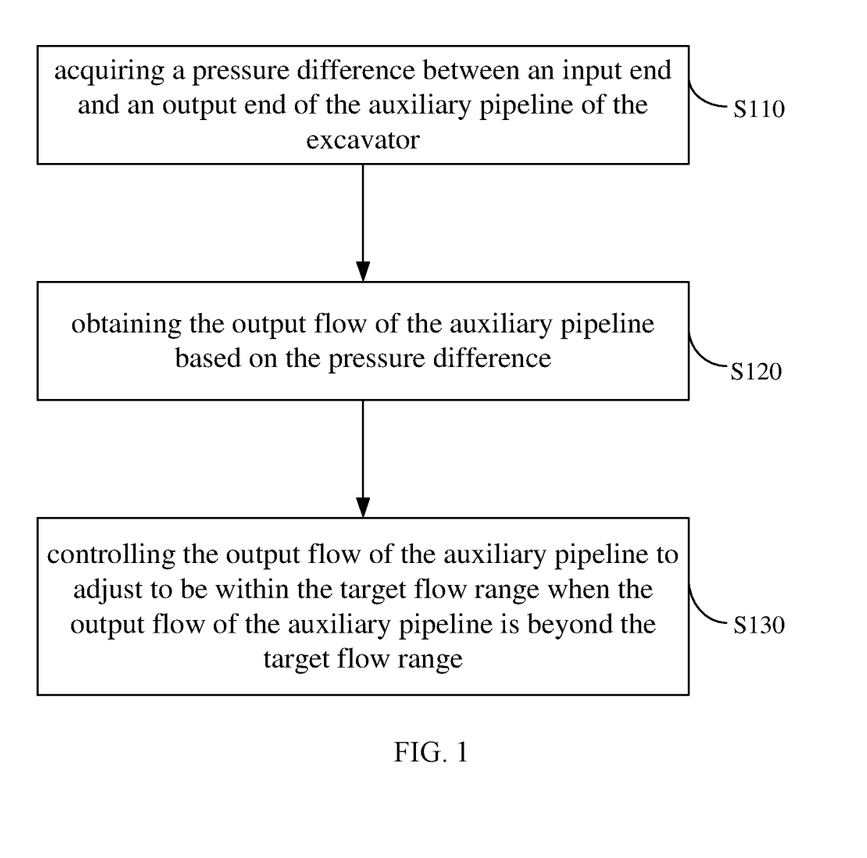
FIG. 1 is a schematic flowchart of a control method for an auxiliary pipeline of an excavator according to the present application.

A control method and a control device for an auxiliary pipeline of an excavator, a working machine and an electronic apparatus according to the present application will be described below with reference to FIG. 1 to FIG. 3.

The present application provides the control method for the auxiliary pipeline of the excavator. As shown in FIG. 1, the control method for the auxiliary pipeline of the excavator includes:

step S110, acquiring a pressure difference between an input end and an output end of the auxiliary pipeline of the excavator.

The excavator can control an auxiliary device such as a breaker hammer and a hydraulic shear through the auxiliary pipeline.

In some embodiments, two pressure sensors may be provided on the auxiliary pipeline of the excavator.

In the above-mentioned embodiment, a first pressure sensor is provided at a rear end of a proportional valve of a main pump (i.e., electromagnetic proportional overflow valve) (i.e., an output end of the proportional valve of the main pump), and the output end of the main pump is connected with the auxiliary pipeline through the proportional valve of the main pump, a first transition block and a first flange in turn. The first transition block may be metal materials such as stainless steel or galvanized steel, and the shape of the first transition block may be a cuboid.

A mounting hole is provided on the first transition block, and the first pressure sensor is provided in the mounting hole. Since a size of the pressure sensor is greater than a thickness of the flange (the thickness of the flange is generally 10 mm, and the length of the pressure sensor is 12 mm), the pressure sensor cannot be mounted on the flange. Therefore, one transition block can be provided here.

The first pressure sensor is used to monitor the pressure at the front end of the auxiliary pipeline. The output end of the main pump is connected with the input end of the auxiliary pipeline through the proportional valve of the main pump. The output flow of the main pump can be adjusted through the proportional valve of the main pump, that is, the input flow of the auxiliary pipeline is adjusted.

The second pressure sensor is provided at the end of the auxiliary pipeline. The output end of the auxiliary pipeline is connected with the auxiliary device such as the breaker hammer or the hydraulic shear through a second flange and a second transition block in turn. The second transition block can be metal materials such as stainless steel or galvanized steel, and the shape of the second transition block can be a cuboid. A mounting hole is provided in the second transition block, and the second pressure sensor can be provided in the mounting hole.

The second pressure sensor is used to monitor the pressure at the end of the auxiliary pipeline. After obtaining the pressure data collected by the two pressure sensors, the pressure difference of the auxiliary pipeline of the excavator can be calculated.

In the above embodiments, the pressure sensor may be a diffused silicon pressure transmitter, or a semiconductor piezoresistive pressure sensor, or an electrostatic capacity pressure sensor.

Step S120, obtaining the output flow of the auxiliary pipeline based on the pressure difference.

Obtaining the output flow of the auxiliary pipeline based on the pressure difference, specifically including:

inputting the pressure difference of the auxiliary pipeline to a relationship model between the pressure difference and the output flow of the auxiliary pipeline to obtain the output flow of the auxiliary pipeline.

The relationship model between the pressure difference and the output flow is obtained by the following method:

obtaining multiple sets of experimental data of the pressure difference and multiple sets of experimental data of the output flow of the auxiliary pipeline; and fitting the multiple sets of experimental data of the pressure difference and the multiple sets of experimental data of the output flow based on the interpolation method, to obtain the relationship model between the pressure difference and the output flow.

This step may be performed before inputting the pressure difference of the auxiliary pipeline to the relationship model between the pressure difference and the output flow of the auxiliary pipeline.

In some embodiments, the relationship model between the pressure difference and the output flow satisfies:

$Q_o = K\sqrt{\Delta P}$, $Q_o$ is the output flow of the auxiliary pipeline, $\Delta P$ is the pressure difference of the auxiliary pipeline, that is, the input flow of the auxiliary pipeline minus the output flow of the auxiliary pipeline, and K is the correlation coefficient between the pressure difference and the output flow.

There is a corresponding relationship between the pressure difference of the auxiliary pipeline and the output flow of the auxiliary pipeline, and the corresponding relationship corresponds to the fluid in the auxiliary pipeline, as well as the shape and the nozzle size of the auxiliary pipeline.

Step S130, controlling the output flow of the auxiliary pipeline to adjust to be within the target flow range when the output flow of the auxiliary pipeline is beyond the target flow range.

Compared with the related art in which the flow of the auxiliary pipeline is estimated by the current value of the proportional valve of the main pump, the output flow of the auxiliary pipeline calculated here is directly calculated according to the pressure difference of the auxiliary pipeline, which is more in line with the actual situation, and is adjusted directly based on the relationship between the output flow of the auxiliary pipeline and the target flow range, which can avoid the distortion of the pressure and the flow in the auxiliary pipeline, and can ensure that the output flow of the auxiliary pipeline is stable within the target flow range. Therefore, it is possible to accurately control the input and output of the auxiliary pipeline, and reduce the damage to the main pump or other hydraulic components of the excavator caused by the distortion of the pressure and the flow of the auxiliary pipeline.

In some embodiments, when the output flow of the auxiliary pipeline is beyond the target flow range, controlling the output flow of the auxiliary pipeline to adjust to be within the target flow range includes:

when the output flow of the auxiliary pipeline is beyond the target flow range, decreasing or increasing the output flow of the main pump to control the output flow of the auxiliary pipeline to be within the target flow range; and the input end of the auxiliary pipeline is connected to the output end of the main pump.

It can be understood that when the output flow of the auxiliary pipeline is determined to be greater than the target flow range, the output flow of the main pump is decreased, and when the output flow of the auxiliary pipeline is determined to be less than the target flow range, the output flow of the main pump is increased. Since the input end of the auxiliary pipeline is connected to the output end of the main pump, after decreasing the output flow of the main pump, the input flow and the output flow of the auxiliary pipeline will also decrease. After increasing the output flow of the main pump, the input flow and the output flow of the auxiliary pipeline will also increase.

In some embodiments, when the output flow of the auxiliary pipeline is beyond the target flow range, decreasing or increasing the output flow of the main pump includes:

when the output flow of the auxiliary pipeline is beyond the target flow range, the output flow value of the main pump is obtained based on the difference between the output flow of the auxiliary pipeline and the target flow range.

The output flow value of the main pump is input to the relationship model between the current value of the proportional valve of the main pump and the output flow of the main pump to obtain the current value of the proportional valve of the main pump.

Based on the current value of the proportional valve of the main pump, the opening of the proportional valve of the main pump is controlled to decrease or increase the output flow of the main pump.

The proportional valve of the main pump here is an electromagnetic proportional overflow valve, through which the output flow of the main pump is controlled.

The output flow value of the main pump is input to the relationship model between the current value of the proportional valve of the main pump and the output flow of the main pump, and the obtained current value of the proportional valve of the main pump is more accurate, which can improve the control efficiency of the proportional valve of the main pump and save the control time of the proportional valve of the main pump, so that the output flow of the auxiliary pipeline can be adjusted more efficiently to the target flow range.

When the output flow $Q_o$ of the auxiliary pipeline is less than $Q_{min}$, the comparison result information is fed back to a controller of the excavator, and the controller can increase the current of the electromagnetic proportional overflow valve that controls the output flow of the main pump, thereby increasing the output flow of the main pump, and increasing the real-time output flow of the auxiliary pipeline.

When the output flow $Q_o$ of the auxiliary pipeline is greater than $Q_{max}$, the comparison result information is fed back to the controller of the excavator, and the controller can decrease the current of the electromagnetic proportional overflow valve that controls the output flow of the main pump, thereby decreasing the output flow of the main pump, and decreasing the real-time output flow of the auxiliary pipeline.

Through the above dynamic adjustment method, it is finally ensured that the output flow of the auxiliary pipeline is controlled within the target flow range.

In some embodiments, the control method for the auxiliary pipeline of the excavator further includes:
obtaining multiple sets of current values of the proportional valve of the main pump, and multiple sets of output flow values of the main pump corresponding to the multiple sets of current values; and
fitting the multiple sets of current values of the proportional valve of the main pump and the multiple sets of output flow values of the main pump corresponding to the multiple sets of current values based on an interpolation method, to obtain the relationship model between the current value of the proportional valve of the main pump and the output flow of the main pump.

The relationship model between the current value of the proportional valve of the main pump and the output flow of the main pump obtained by the above method can accurately reflect the relationship between the current value of the proportional valve of the main pump and the output flow of the main pump. The current value of the proportional valve of the main pump obtained through this model is also more accurate.

The control device for the auxiliary pipeline of the excavator according to the present application is described below, and the control device for the auxiliary pipeline of the excavator described below and the control method for the auxiliary pipeline of the excavator described above can correspond to each other for reference.

Figure 2:
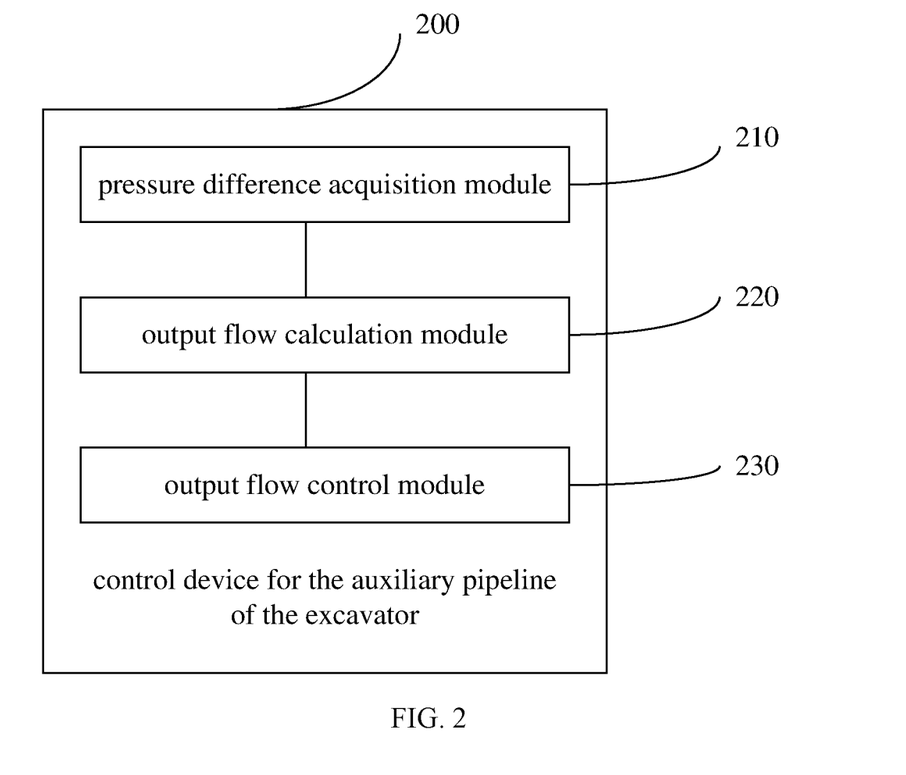
FIG. 2 is a principle diagram of a control device for the auxiliary pipeline of the excavator according to the present application.

As shown in FIG. 2, the control device 200 for the auxiliary pipeline of the excavator includes: a pressure difference acquisition module 210, an output flow calculation module 220, and an output flow control module 230.

The pressure difference acquisition module 210 is configured to acquire the pressure difference of the auxiliary pipeline of the excavator.

The output flow calculation module 220 is configured to obtain the output flow of the auxiliary pipeline based on the pressure difference.

In some embodiments, the output flow calculation module 220 is configured to input the pressure difference into the relationship model between the pressure difference and the output flow of the auxiliary pipeline to obtain the output flow of the auxiliary pipeline.

There is a corresponding relationship between the pressure difference of the auxiliary pipeline and the output flow of the auxiliary pipeline, and the corresponding relationship corresponds to the fluid in the auxiliary pipeline, as well as the shape and the nozzle size of the auxiliary pipeline.

In some embodiments, the control device 200 for the auxiliary pipeline of the excavator further includes: a pressure difference and flow data acquisition module, and a pressure difference and flow relationship model acquisition module.

The pressure difference and flow data acquisition module is configured to acquire multiple sets of experimental data of the pressure difference and multiple sets of experimental data of the output flow of the auxiliary pipeline.

The pressure difference and flow relationship model acquisition module is configured to fit the multiple sets of experimental data of the pressure difference and the multiple sets of experimental data of the output flow based on the interpolation method to obtain a relationship model between the pressure difference and the output flow.

The relationship model between the pressure difference and the output flow satisfies:

$Q_o = K\sqrt{\Delta P}$, $Q_o$ is the output flow of the auxiliary pipeline, $\Delta P$ is the pressure difference of the auxiliary pipeline, that is, the input flow of the auxiliary pipeline minus the output flow of the auxiliary pipeline, K is a correlation coefficient between the pressure difference and the output flow.

The output flow control module 230 is configured to adjust the output flow of the auxiliary pipeline to the target flow range in response to that the output flow of the auxiliary pipeline is beyond the target flow range.

It should be noted that, compared to the related art in which the flow of the auxiliary pipeline is estimated through the current value of the proportional valve of the main pump, the output flow of the auxiliary pipeline calculated by the output flow calculation module 220 is directly calculated according to the pressure difference of the auxiliary pipeline, which is more in line with the actual situation. Then the output flow control module 230 adjusts directly based on the relationship between the output flow of the auxiliary pipeline and the target flow range, which can avoid the distortion of the pressure and flow in the auxiliary pipeline, and can also ensure that the output flow of the auxiliary pipeline is stable within the target flow range. By accurately controlling the input and output of the auxiliary pipeline, it is possible to reduce the damage to the main pump or other hydraulic components of the excavator caused by the distortion of the pressure and flow of the auxiliary pipeline.

In some embodiments, the control device 200 for the auxiliary pipeline of the excavator further includes two pressure sensors provided on the auxiliary pipeline of the excavator.

In the above-mentioned embodiment, a first pressure sensor is provided at a rear end of the proportional valve of the main pump (i.e., electromagnetic proportional overflow valve) (i.e., the output end of the proportional valve of the main pump) to monitor the pressure at a front end of the auxiliary pipeline. The output end of the main pump is connected to the input end of the auxiliary pipeline through the proportional valve of the main pump, and the output flow of the main pump can be adjusted through the proportional valve of the main pump, that is, the input flow of the auxiliary pipeline can be adjusted.

A second pressure sensor is provided at an end of the auxiliary pipeline to monitor the pressure at the end of the auxiliary pipeline. After the pressure difference acquisition module 210 acquires the pressure data collected by the two pressure sensors, it is possible to calculate the pressure difference of the auxiliary pipeline of the excavator.

In the above embodiments, the pressure sensor may be a diffused silicon pressure transmitter, or a semiconductor piezoresistive pressure sensor, or an electrostatic capacity pressure sensor.

In some embodiments, the output flow control module 230 decreases or increases the output flow of the main pump when the output flow of the auxiliary pipeline is beyond the target flow range, so as to control the output flow of the auxiliary pipeline to be within the target flow range. The input end of the auxiliary pipeline is connected with the output end of the main pump.

It can be understood that the output flow control module 230 decreases the output flow of the main pump when the output flow of the auxiliary pipeline is greater than the target flow range, and increases the output flow of the main pump when the output flow of the auxiliary pipeline is less than the target flow range. Since the input end of the auxiliary pipeline is connected to the output end of the main pump, after decreasing the output flow of the main pump, the input flow and the output flow of the auxiliary pipeline will also decrease. After increasing the output flow of the main pump, the input flow and the output flow of the auxiliary pipeline will also increase.

The output flow control module 230 includes: a flow difference calculation unit, a main pump proportional valve current value calculation unit, and a main pump output control unit.

The flow difference calculation unit is configured to obtain the output flow value of the main pump based on the difference between the output flow of the auxiliary pipeline and the target flow range when the output flow of the auxiliary pipeline is beyond the target flow range.

The proportional valve of the main pump current value calculation unit is configured to input the output flow value of the main pump to the relationship model between the current value of the proportional valve of the main pump and the output flow of the main pump to obtain the current value of the proportional valve of the main pump.

The main pump output control unit is configured to control the opening of the proportional valve of the main pump based on the current value of the proportional valve of the main pump, and decrease or increase the output flow of the main pump.

In some embodiments, the control device 200 for the auxiliary pipeline of the excavator further includes: a current and flow data acquisition module, and a current and flow relationship model acquisition module.

The current and flow data acquisition module is configured to acquire multiple sets of current values of the proportional valve of the main pump, and multiple sets of output flow values of the main pump corresponding to the multiple sets of current values.

The current and flow relationship model acquisition module is configured to fit multiple sets of current values of the proportional valve of the main pump and multiple sets of output flow values of the main pump corresponding to the multiple sets of current values based on the interpolation method to obtain the relationship model between the current value of the proportional valve of the main pump and the output flow of the main pump.

The relationship model between the current value of the proportional valve of the main pump and the output flow of the main pump obtained by the above method can accurately reflect the relationship between the current value of the proportional valve of the main pump and the output flow of the main pump. The current value of the proportional valve of the main pump obtained through this model is also more accurate.

The working machine according to the present application is described below, and the working machine described below and the control device for the auxiliary pipeline of the excavator described above can correspond to each other for reference.

The working machine includes the above-mentioned control device for the auxiliary pipeline of the excavator, and the working machine may be an excavator or other working machines.

In the work machine according to the present application, since the control device for the auxiliary pipeline of the excavator as described above is provided, it also has various advantages of the control device for the auxiliary pipeline of the excavator as described above.

The electronic apparatus according to the present application is described below, and the electronic apparatus described below and the control method for the auxiliary pipeline of the excavator described above can be referred to in correspondence.

Figure 3:
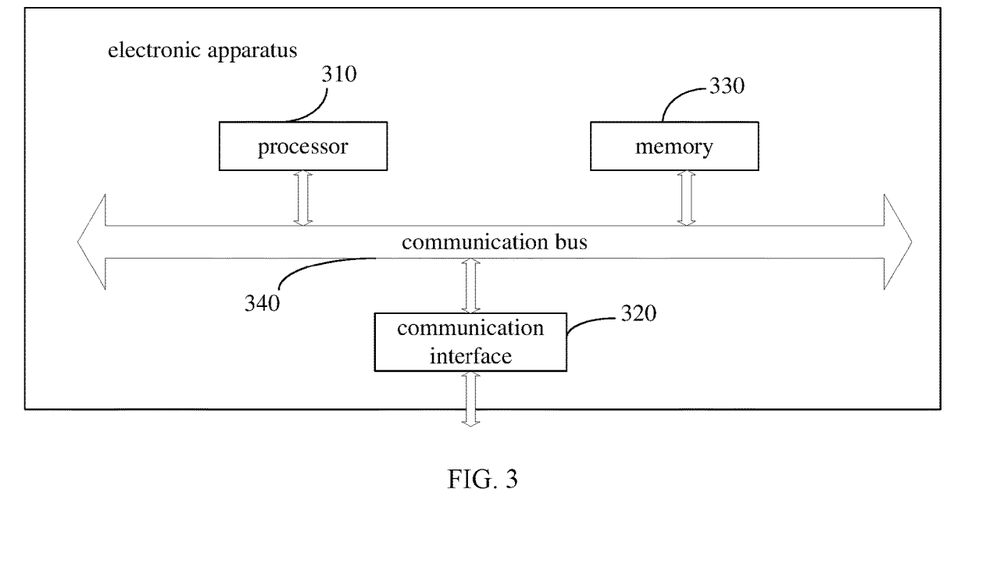
FIG. 3 is a schematic structural diagram of an electronic apparatus according to the present application.

FIG. 3 illustrates a schematic diagram of the physical structure of an electronic apparatus. As shown in FIG. 3, the electronic device may include: a processor (processor) 310, a communication interface (Communications Interface) 320, a memory (memory) 330 and a communication bus 340, wherein the processor 310, the communication interface 320, and the memory 330 communicate with each other through the communication bus 340. The processor 310 can call the logic instructions in the memory 330 to execute the control method for the auxiliary pipeline of the excavator. The method includes: acquiring the pressure difference of the auxiliary pipeline of the excavator; inputting the pressure difference to the relationship model between the pressure difference and the output flow of the auxiliary pipeline to obtain the output flow of the auxiliary pipeline; and when the output flow of the auxiliary pipeline is beyond the target flow range, controlling the output flow of the auxiliary pipeline to within the target flow range.

In addition, the above logic instructions in the memory 330 may be implemented in the form of software function units, and may be stored in a computer-readable storage medium when sold or used as an independent product. Based on this understanding, the essence of the technical solution of the present application or the part that contributes to the related art or the part of the technical solution can be embodied in the form of a software product. The computer software product is stored in a storage medium, including several instructions configured to make a computer device (which may be a personal computer, a server, or a network device, etc.) execute all or part of the steps of the methods described in the various embodiments of the present application. The aforementioned storage media includes: U disk, mobile hard disk, read-only memory (ROM), random access memory (RAM), magnetic disk or optical disc and other media that can store program codes.

On the other hand, the present application also provides a computer program product. The computer program product includes a computer program stored on a non-transitory computer-readable storage medium. The computer program includes program instructions, and when the program instructions are executed by a computer, the computer can execute the control method for the auxiliary pipeline of the excavator provided by the above methods. The method includes: obtaining the pressure difference of the auxiliary pipeline of the excavator; inputting the pressure difference to the relationship model between the pressure difference and the output flow of the auxiliary pipeline to obtain the output flow of the auxiliary pipeline; and when the output flow of the auxiliary pipeline is beyond the target flow range, controlling the output flow of the auxiliary pipeline to within the target flow range.

In yet another aspect, the present application also provides a non-transitory computer-readable storage medium, on which a computer program is stored, and implemented when the computer program is executed by a processor, to perform the above control methods for the auxiliary pipeline of the excavator. The method includes: obtaining the pressure difference of the auxiliary pipeline of the excavator; inputting the pressure difference to the relationship model between the pressure difference and the output flow of the auxiliary pipeline to obtain the output flow of the auxiliary pipeline; and controlling the output flow of the auxiliary pipeline to be within the target flow range when the output flow of the auxiliary pipeline is beyond the target flow range.

The device embodiments described above are only illustrative. The units described as separate components may or may not be physically separated, and the components shown as units may or may not be physical units, that is, they may be located in one place, or they can be distributed to multiple network units. Part or all of the modules can be selected according to actual needs to achieve the purpose of the solution of this embodiment. It can be understood and implemented by those skilled in the art without any creative efforts.

Through the above description of the implementations, those skilled in the art can clearly understand that each implementation can be implemented by means of software plus a necessary general hardware platform, and of course can also by hardware. Based on this understanding, the essence of the above technical solutions or the part that contributes to related technologies can be embodied in the form of software products, and the computer software products can be stored in computer-readable storage media, such as ROM/RAM, disk, CD, etc., including several commands to make a computer device (which may be a personal computer, server, or network device, etc.) execute the methods described in each embodiment or some parts of the embodiments.

Finally, it should be noted that: the above embodiments are only used to illustrate the technical solutions of the present application, and are not intended to limit them; although the present application has been described in detail with reference to the foregoing embodiments, those skilled in the art should understand that: modifications can still be made to the technical solutions described in the foregoing embodiments, or equivalent replacements are made to some of the technical features; and these modifications or replacements do not make the essence of the corresponding technical solutions deviate from the spirit and scope of the technical solutions of the various embodiments of the present application.

What is claimed is:

1. A control method for an auxiliary pipeline of an excavator, comprising:
    acquiring a pressure difference between an input end and an output end of the auxiliary pipeline of the excavator;
    obtaining an output flow of the auxiliary pipeline based on the pressure difference; and
    controlling the output flow of the auxiliary pipeline to adjust to be within a target flow range in response to that the output flow of the auxiliary pipeline is beyond the target flow range,
    wherein obtaining the output flow of the auxiliary pipeline based on the pressure difference comprises:
    inputting the pressure difference to a relationship model between the pressure difference and the output flow of the auxiliary pipeline to obtain the output flow of the auxiliary pipeline;
    wherein the relationship model between the pressure difference and the output flow is obtained by the following method:
    acquiring multiple sets of experimental data of the pressure difference and multiple sets of experimental data of the output flow of the auxiliary pipeline; and
    fitting the multiple sets of experimental data of the pressure difference and the multiple sets of experimental data of the output flow based on an interpolation method to obtain the relationship model between the pressure difference and the output flow.

2. The control method for the auxiliary pipeline of the excavator according to claim 1, wherein the relationship model between the pressure difference and the output flow satisfies:
    $Q_o = K\sqrt{\Delta P}$, $Q_o$ is the output flow of the auxiliary pipeline, $\Delta P$ is the pressure difference of the auxiliary pipeline, and K is a correlation coefficient between the pressure difference and the output flow.

3. The control method for the auxiliary pipeline of the excavator according to claim 1, wherein controlling the output flow of the auxiliary pipeline to adjust to be within the target flow range in response to that the output flow of the auxiliary pipeline is beyond the target flow range comprises:
    decreasing or increasing the output flow of a main pump to control the output flow of the auxiliary pipeline to adjust to be within the target flow range in response to that the output flow of the auxiliary pipeline is beyond the target flow range; wherein an input end of the auxiliary pipeline is connected to an output end of the main pump.

4. The control method for the auxiliary pipeline of the excavator according to claim 3, wherein decreasing or increasing the output flow of the main pump in response to that the output flow of the auxiliary pipeline is beyond the target flow range comprises:
    obtaining an output flow value of the main pump based on a difference between the output flow of the auxiliary pipeline and the target flow range, in response to that the output flow of the auxiliary pipeline is beyond the target flow range;
    inputting the output flow value of the main pump to the relationship model between a current value of a proportional valve of the main pump and the output flow of the main pump to obtain the current value of the proportional valve of the main pump; and
    controlling an opening of the proportional valve of the main pump based on the current value of the proportional valve of the main pump, to decrease or increase the output flow of the main pump.

5. An electronic apparatus, comprising a memory, a processor, and a computer program stored on the memory and operable on the processor, wherein steps of the control method for an auxiliary pipeline of an excavator according to claim 1 is implemented when the processor executes the program.

6. A non-transitory computer-readable storage medium, on which a computer program is stored, wherein steps of the control method for an auxiliary pipeline of an excavator according to claim 1 is implemented when the computer program is executed by a processor.

* * * * *